United States Patent [19]

Tsakanikas

[11] 4,427,848

[45] Jan. 24, 1984

[54] TELEPHONIC ALPHANUMERIC DATA TRANSMISSION SYSTEM

[76] Inventor: Peter J. Tsakanikas, 1911 Fort Myer Dr., Arlington, Va. 22209

[21] Appl. No.: 335,516

[22] Filed: Dec. 29, 1981

[51] Int. Cl.³ .......................................... H04M 11/06
[52] U.S. Cl. ............................. 179/2 DP; 179/84 VF
[58] Field of Search ................... 179/2 C, 2 DP, 2 A, 179/2 AM, 2 R, 2 CA, 84 VF, 15 M

[56] References Cited

U.S. PATENT DOCUMENTS

| | | | |
|---|---|---|---|
| 3,381,276 | 4/1968 | James | 179/2 DP |
| 3,618,038 | 11/1971 | Stein | 179/20 DP X |
| 3,647,973 | 3/1972 | James et al. | 179/2 DP |
| 3,870,821 | 3/1975 | Steury | 179/2 DP |
| 4,012,599 | 3/1977 | Meyer | 179/2 DP X |
| 4,307,266 | 12/1981 | Messina | 179/2 DP |

OTHER PUBLICATIONS

Broomfield et al., *Electronics*, "Making a Data Terminal out of the Touch-Tone Telephone" McGraw Hill, Jul. 3, 1980.

Bell System Telephone Pub. 41409, "Data Set 407C Interface Specification", Nov. 1977.

*Primary Examiner*—G. Z. Rubinson
*Assistant Examiner*—W. J. Brady
*Attorney, Agent, or Firm*—Cushman, Darby & Cushman

[57] ABSTRACT

A system for translating interconnection supervisory signals, such as Touch Tone signals or dial pulses, from a remote telephone set into alphanumeric data. The system is capable of utilizing any one of a plurality of translation schemes, chosen by the user at the telephone set. Synthesized speech feedback is provided to the user after entry of each character. A number of new translation techniques are also disclosed.

52 Claims, 7 Drawing Figures

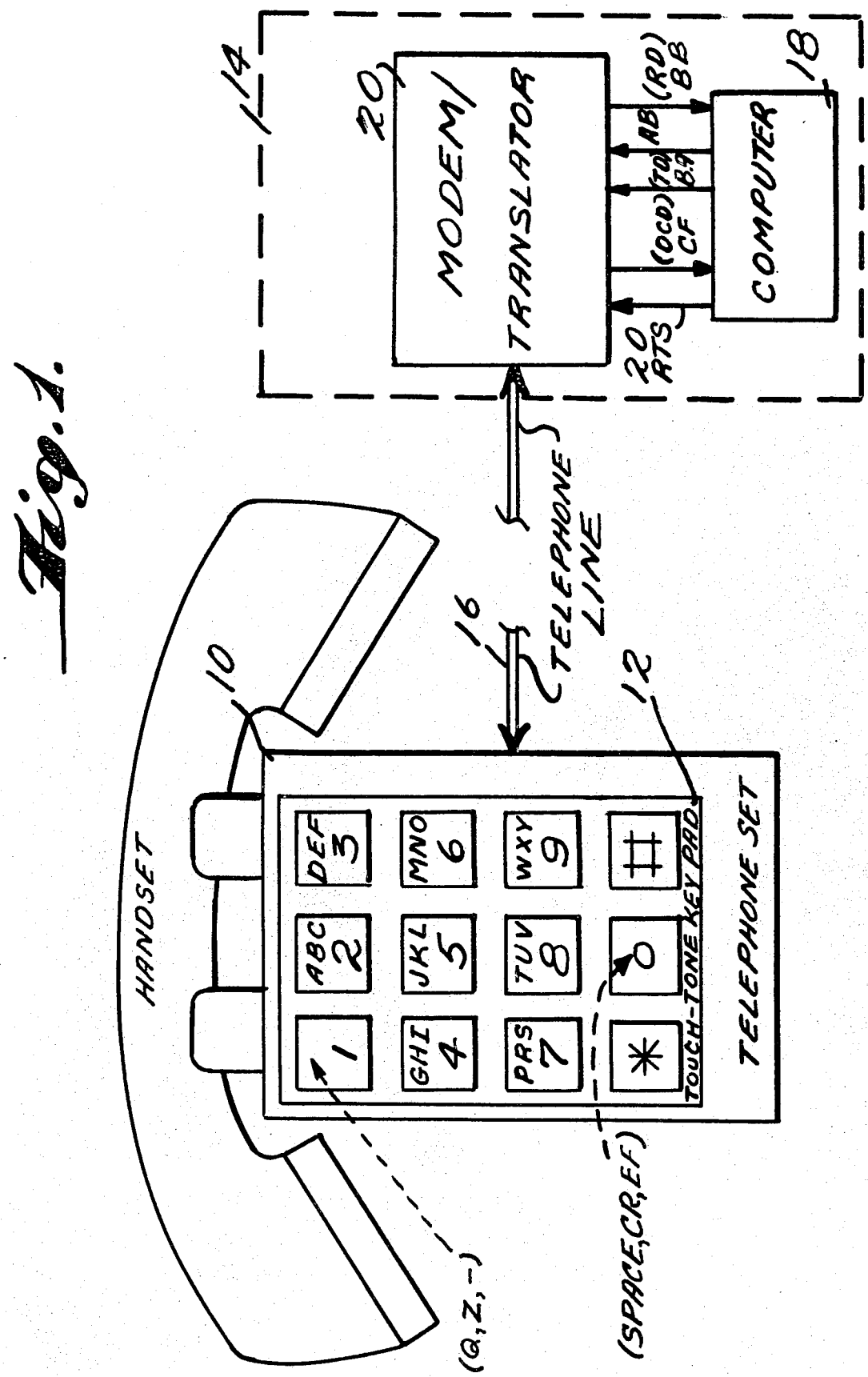

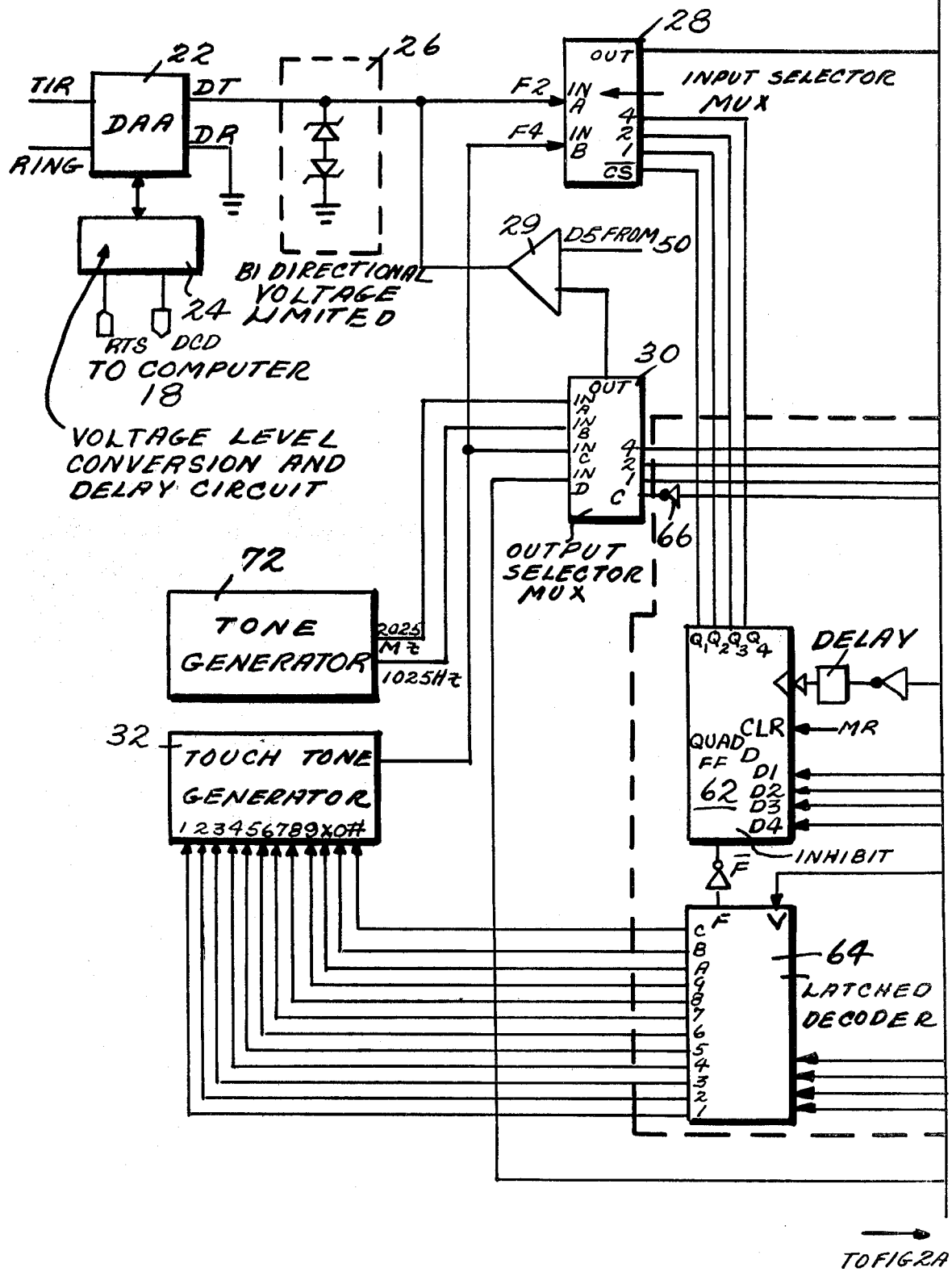

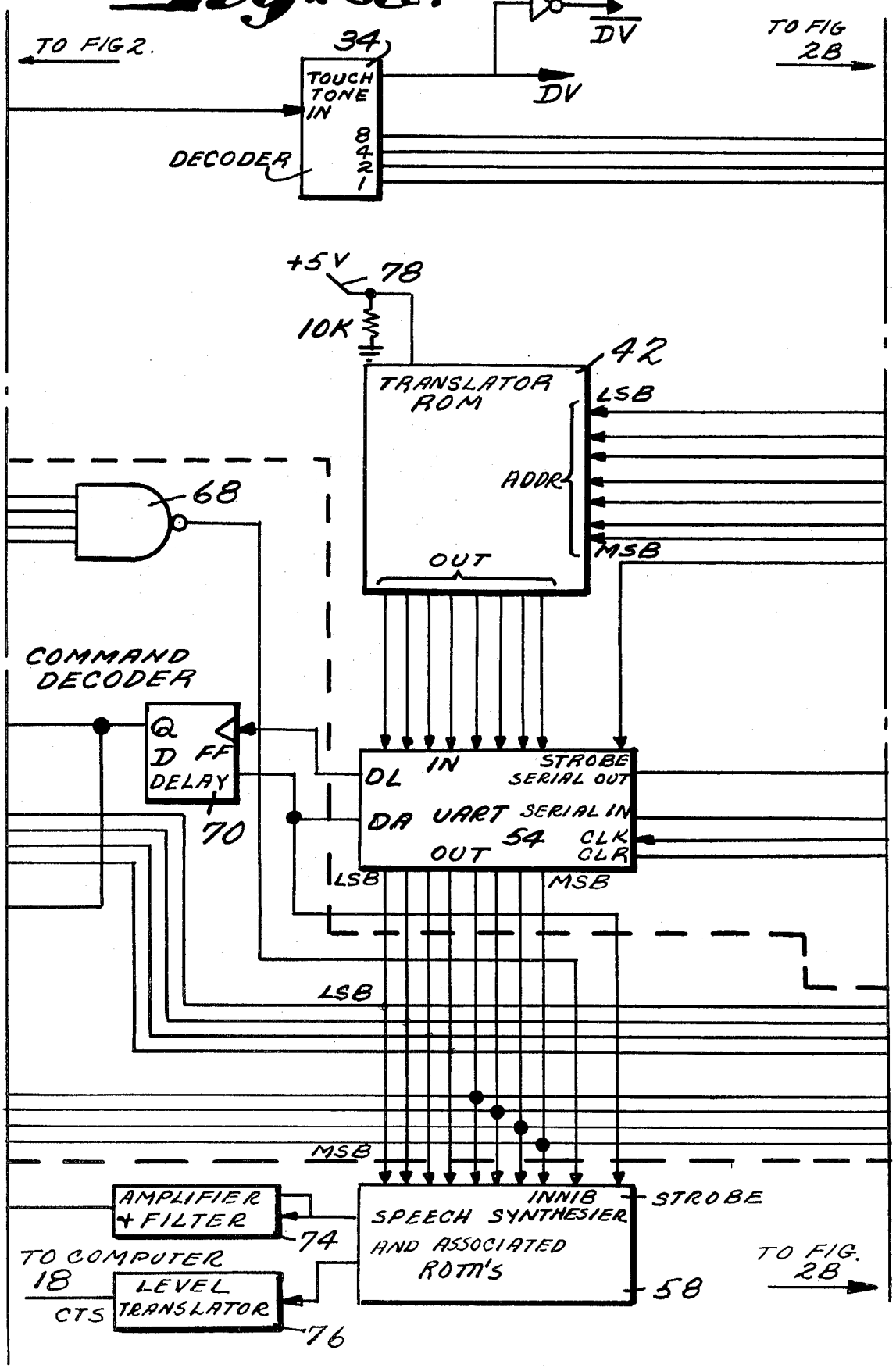

TELEPHONIC ALPHANUMERIC DATA TRANSMISSION SYSTEM

BACKGROUND OF THE INVENTION

The present invention relates to a telephonic alphanumeric data transmission system, and, more particularly, to a system for providing transmission of alphanumeric data through the standard switched network telephone system utilizing a standard telephone set.

There is an ever increasing need to provide direct access to computer based systems without the necessity of special transmitters. For example, it is becoming increasingly desirable to conduct business transactions by phone without requiring human intervention between the caller and data processing apparatus. Specific examples include credit card validation, banking, off track betting, stock market transactions, commodities transactions, placing reservations, ticketing, and retail and wholesale sales.

It would be desirable to transmit data utilizing the Touch Tone (DTMF) transmitter of the standard telephone set. However, a problem arises in that the standard telephone dial or touch tone key pad is designed to provide only 10 or 12 distinct characters, necessitating the interposition some manner of translating device between the standard telephone set and the computer in order to transmit alphanumeric data.

A typical Touch Tone telephone set (transmitter) typically includes 12 push-buttons, or keys, disposed in a matrix of 4 horizontal rows by 3 vertical columns. Each of the keys has associated therewith 2 distinct frequencies: a frequency chosen from a group ("A") of relatively low frequencies, corresponding to the row wherein the button is disposed; and a frequency selected from a group ("B") of relatively high frequencies, corresponding to the column wherein the button is disposed. Depression of a given key causes transmission of a dual tone (DTMF) signal having frequencies components at both the group A (row) and group B (column) frequencies associated with the disposition of the key in the matrix.

Each key of the Touch Tone phone conventionally is inscribed with both numerical designations (0–9) as well as alphabetic designations, as shown in Table I.

TABLE I

| Numeric | Alphabetic | | |
|---|---|---|---|
| | Div. 1 | Div. 2 | Div. 3 |
| 1 | — | — | — |
| 2 | A | B | C |
| 3 | D | E | F |
| 4 | G | H | I |
| 5 | J | K | L |
| 6 | M | N | O |
| 7 | P | R | S |
| 8 | T | U | V |
| 9 | W | X | Y |
| * | — | — | — |
| 0 | — | — | — |
| # | — | — | — |

The alphabetic characters "Z" and "Q" are not portrayed on the standard touch tone set, but can be considered to be associated with a predetermined one of the numeric 0 or 1 keys. The individual keys will hereinafter be referred to by the numeric or * or # symbols inscribed thereon.

In general, systems for translating touch tone signals into alphanumeric data are known. For example, U.S. Pat. No. 3,381,275 issued on Apr. 30, 1968 to the present inventor, describes a translator system utilizing what is known as a "twin depression" translation technique. Simultaneous depression of a plurality of keys produces a signal having frequency characteristics (e.g., a single frequency), which may be discriminated from the pairs of frequencies generated in response to depression of a single key. For example, an alphabetic character may be transmitted using the "twin depression" as follows. The alpha characters, i.e., alphabetic characters, may be considered to be divided into three divisions, (hereinafter referred to as "placement divisions" or "order divisions") corresponding to the order or placement in which the characters are inscribed on the key:

Division 1-A, D, G, J, M, P, T, W;
Division 2-B, E, H, K, N, R, U, X, (Z);
Division 3-C, F, I, L, O, S, V, Y, (Q).

An alphabetic character is transmitted by first simultaneously depressing a predetermined pair of keys indicative of the placement division of the character (e.g. simultaneously depressing keys 2 and 3 for alphabetic characters in Division 1; 5 and 6 for alphabetic characters in Division 2; and 8 and 9 for alphabetic characters in Division 3. The key inscribed with the particular alphabetic character is then depressed. A return to the numeric mode can be effected by depressing a designated clear key (e.g., *), whereafter depression of a key will be translated into its numeric designation.

Another example, of a touch tone to alphanumeric translator is described in U.S. Pat. No. 3,618,038 issued Nov. 2, 1971 to Edward S. Stein. The Stein translator utilizes what is known as the "delayed depression" translation technique, wherein depression of keys having different durations are discriminated. For example, an alphabetic character is represented by first depressing a key indicative of the placement division of the alphabetic character (e.g. the 1 key for Division 1, the 2 key for Division 2, or the 3 key for Division 3) for a duration longer than a preset limit, e.g. 290 milliseconds. The key inscribed with the particular alphabetic character is thereafter depressed for a duration less than the preset limit. Return to the numeric mode is effected by depressing a fourth symbol (e.g. the 0 key) for a period greater than the preset limit.

Another touch tone to alphanumeric translation technique has been proposed whereby an alphabetic mode is entered by depressing a first key (e.g., *), followed by depressing a designated key corresponding to the placement division of a particular alphabetic character (e.g., 1, 2, or 3), followed by depression of the key on which the alphabetic character is inscribed.

In addition, other translation techniques whereby each alphanumeric symbol is represented by a specific sequence of DTMF signals, with each character separated by a specific designated DTMF signal (e.g. #) have been proposed. An example of such a translation technique is described in Broomfield et al, *Electronics,* "Making a Data Terminal Out of the Touch-Tone Telephone", McGraw Hill, July 3, 1980.

Each of the above translation systems may have advantages in respect of the transmission of certain types of data. However, such techniques are, in general, slow and cumbersome, in that different combinations of a plurality of keys must be depressed to transmit the alphabetic characters. Many people do not possess sufficient manual dexterity to use such systems proficiently.

In addition, a further problem is inherent in the prior art translation systems, in that the user is provided no feedback during the entry of the data. The user is provided no indication that any valid data character has been transmitted, much less an indication of the specific data character transmitted. Particularly in view of the multi-key entry techniques, mistakes in the data often occur.

SUMMARY OF THE INVENTION

The present invention provides respective new, less cumbersome, translation techniques, and a system which provides proper and adequate feedback to the user as the information is entered.

More particularly, in accordance with one aspect of the present invention, a first new translation technique is provided whereby characters are represented using only two different keys, thus lessening the chance of miskeying a character. The alphabetic characters are transmitted by depressing a designated key (e.g., *) a number of times equal to the relative position of the inscription of the character on the key (i.e., the placement division of the alphabetic character), followed by the depression of the key on which the character is inscribed. A return to the numeric mode may be effected by depression of a second designated key (e.g. #).

In accordance with another aspect of the invention, a translation technique including an "alpha" mode wherein depressions of only a single key effects transmission of an alphabetic character is provided. In essence, an alphabetic character is represented by depressing the particular key on which the character is inscribed a number of times equal to the placement division of the character. However, the key depressions corresponding to each placement division preceding the placement division of the relevant character are for short durations, whereas the depression indicative of the placement division of the character is for a duration longer than a preset duration.

In accordance with another aspect of the present invention, a system is provided which is capable of translating data entered using only one of a number of different translation techniques and provides a voice synthesized feedback signal to the user after entry of each character.

BRIEF DESCRIPTION OF THE DRAWINGS

A preferred exemplary embodiment of the present invention hereinafter to be described in conjunction with the appended drawing, wherein like numerals denote like elements and:

FIG. 1 is a pictorial block diagram of a system in accordance with the present invention;

DETAILED DESCRIPTION OF A PREFERRED EXEMPLARY EMBODIMENT

Figure 2B:
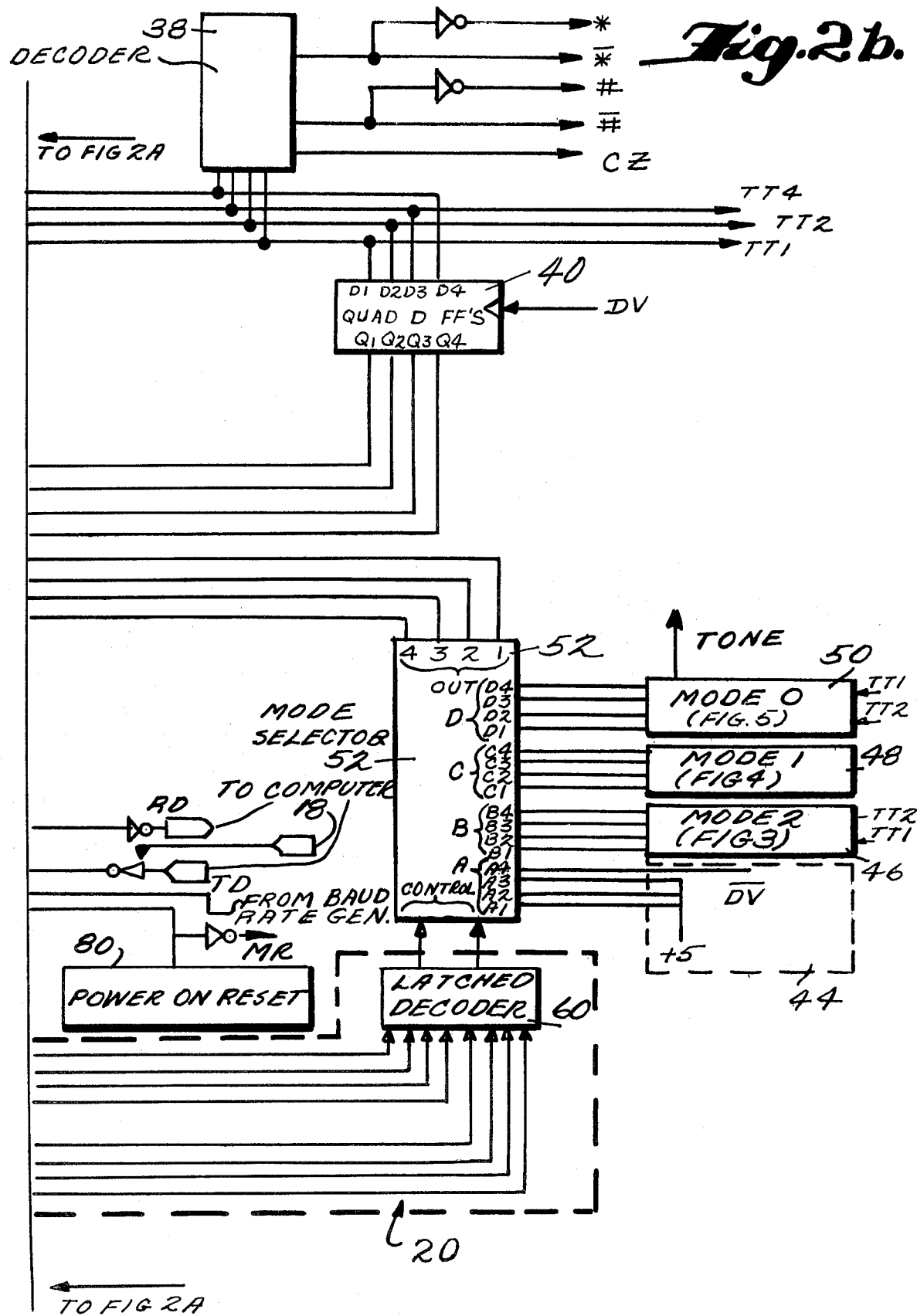
FIG. 2 is a schematic diagram of a multimode translator with feedback in accordance with the present invention.

Referring now to FIG. 1, a standard telephone set 10, including means for generating interconnection supervisory signals such as a touch tone key pad 12, establishes communication with a remote site 14 through the existing switched network telephone system, generally indicated as 16. Remote site 14 suitably includes a computer or other data processing apparatus 18 and a modem/translator 20, suitabley interfaced in accordance with EIA convention RS-232-C. Modem/translator 20 will be hereinafter more fully described in conjunction with FIG. 2.

Communication between telephone set 10 and remote site 14 is established by generating appropriate interconnection command signals to the telephone system, e.g. keying the assigned telephone number of remote site 14 into the telephone system using telephone set key pad 12. The telephone system generates a "ring" signal to modem/translator 20, whereupon a connection through the telephone system is effected. Data is then transmitted, represented as a sequence of interconnection supervisory signals. More particulary, data signals are then generated by depressing the appropriate keys on key pad 12 to generate Touch Tone (DTMF) signals, which are received and acted upon by modem/translator 20. In general, modem/translator 20 converts the interconnection supervisory signals received from telephone set 10 into a predetermined code (e.g. standard ASCII and EBCDIC) representative of alphanumeric data. The alphanumeric character code is transmitted to computer 14. Computer 18 and modem/translator 20 then cooperate to provide a synthesized speech representation of the transmitted alphanumeric character back through the telephone system to telephone set 10, providing positive feedback to the user.

Referring now to FIG. 2, modem/translator 20 will be described. The tip and ring conductors of telephone system 16 are connected to a conventional data access arrangement (DAA) 22. As will hereinafter be more fully described, DAA 22 operates as an interface between the telephone system and the remainder of modem/translator 20, and, in cooperation with suitable voltage level conversion and delay circuitry 24, provides indicia of incoming calls to computer 18.

DAA 22 includes two output lines, DT and DR, corresponding to the tip and ring lines of the telephone system, respectively. The ring line, DR, is connected to system ground. The tip line, DT, is connected through a bidirectional voltage limiter 26 to one input terminal of a two input, input selector circuit (e.g. multiplexer) 28. Tip line DT is also connected to the output terminal of a suitable output selector circuit 30, through a conventional summing amplifier 29. Bidirectional voltage limiter 26 suitably comprises a pair of 3.3 volt zener diodes connected with opposite polarity between line DT ground.

Input selector 28, is suitably formed of a "1 of 8 analog decoder" chip, such as a C04551BC chip. Address (command) signals to input selector 28 are provided by command decoder logic 31, which will hereinafter be more fully described. The other input of input selector 28 is receptive of touch tone signals generated by a conventional touch tone generator 32. In effect, when enabled, input selector 28 couples one or the other of the input terminals thereof, as determined by the command (address) signals, to the input of an appropriate supervisory signal decoder such as, in the case of DTMF interconnection supervisory signals, a conventional Touch Tone decoder (DTMF receiver) 34.

Touch-Tone decoder 34 generates, in response to the Touch Tone signals applied thereto, a four bit code (binary or BCD) indicative of the particular DTMF signal pair. Touch Tone decoder 34 also generates a data valid signal, DV, which assumes a high state upon completed decoding of any valid DTMF signal pair, and remains high for as long as the DTMF signal is applied to the decoder. The data valid signal thus provides a positive going transition upon the beginning of a DTMF signal, i.e. when the key is depressed. Conversely, the inverse signal $\overline{DV}$ provides a positive going transition when the touch tone signal ends, i.e., when the key is released.

Various suitable Touch Tone decoders 34 generate signals at a 12 volt level, whereas the various logic circuitries utilized in modem/translator 20 generally operate at a 5 volt level. Accordingly, in such case, a voltage level translator (not shown) may be used to convert the 12 volt signals into 5 volt signals compatible with the logic circuitry.

The 4-bit code is applied to a suitable decoder circuit 38. Decoder 38 generates respective signals indicative of the occurrence or non-occurrence of particular code words. More particularly, decoder 38 generates a signal $\overline{*}$ in response to each code other than the code corresponding to the * symbol, a $\overline{\#}$ signal in response to each code other than the code corresponding to the # symbol, and a $\overline{CZ}$ signal indicative of the presence of any valid code (code not zero). The $\overline{CZ}$ signal tracks the data valid signal DV, but is delayed as compared to DV because of inherent delays in the circuitry of decoder 38.

The 4-bit code from decoder 34 is applied to the respective D inputs of a 4-bit register 40 of D type flip-flops. Register 40, clocked by data valid signal DV, stores indicia of the 4-bit code, until the next valid key is generated by decoder 34.

The 4-bit code or certain bits thereof, and the signals from decoder 38 are also applied to various circuits for effecting respective translation techniques, as will hereinafter be more fully explained.

The 4-bit code, latched by register 40, is applied as the four least significant bits of an address signal to a conventional read only memory (ROM) 42 (sometimes hereinafter referred as translator ROM 42). The remaining most significant bits of the address applied to translator ROM 42 are provided by a selected one of a plurality (e.g. four) of respective logic circuits, 44, 46, 48 or 50, corresponding to a particular operational mode/translator technique. As will hereinafter be explained, the selection of the operational mode is effected by suitable mode selection logic 52.

Translator ROM 42 generates, at the output terminals thereof, signals indicative of the contents of a respective 8-bit word identified by the address signals. ROM 42 contains a respective individually addressable memory locations containing each alphanumeric, punctuation, and command symbol in a computer compatible symbol code (e.g. ASCII code).

The respective symbol codes are arranged in memory to facilitate the use of any one of a plurality of translation techniques. In essence, the respective symbol codes are disposed in groups corresponding to the respective placement divisions: numeric division, placement Division 1, placement Division 2, and placement Division 3. The order of the symbol codes within the groups is in accordance with the numeric inscription on the associated keys. More particularly the four least significant bits of the address of the memory location for each symbol are the 4-bit code indicative of the particular DTMF signal corresponding to the key on which the symbol is inscribed (or associated). The remaining most significant bits (provided by the particular selected translation technique circuitry), are indicative of the placement division of the particular symbol. An exemplary memory arrangement is shown in Table II.

TABLE II

| ADDRESS | | ASCII |
|---|---|---|
| 000 | 0000 | NC |
|  | 0001 | 1 |
|  | 0010 | 2 |
|  | 0011 | 3 |
|  | 0100 | 4 |
|  | 0101 | 5 |
|  | 0110 | 6 |
|  | 0111 | 7 |
|  | 1000 | 8 |
|  | 1001 | 9 |
|  | 1010 | 0 |
|  | 1011 | * |
|  | 1100 | # |
|  | 1101 | NC |
|  | 1110 | NC |
|  | 1111 | NC |
| 001 | 0000 | NC |
|  | 0001 | Q |
|  | 0010 | A |
|  | 0011 | D |
|  | 0100 | G |
|  | 0101 | J |
|  | 0110 | M |
|  | 0111 | P |
|  | 1000 | T |
|  | 1001 | W |
|  | 1010 | Print line + CR |
|  | 1011 | * |
|  | 1100 | # |
|  | 1101 | NC |
|  | 1110 | NC |
|  | 1111 | NC |
| 010 | 0000 | NC |
|  | 0001 | Z |
|  | 0010 | B |
|  | 0011 | E |
|  | 0100 | H |
|  | 0101 | K |
|  | 0110 | N |
|  | 0111 | R |
|  | 1000 | U |
|  | 1001 | X |
|  | 1010 | Space |
|  | 1100 | * |
|  | 1101 | # |
|  | 1110 | NC |
|  | 1111 | NC |
|  |  | NC |
| 011 | 0000 | NC |
|  | 0001 | . |
|  | 0010 | C |
|  | 0011 | F |
|  | 0100 | I |
|  | 0101 | L |
|  | 0110 | O |
|  | 0111 | S |
|  | 1000 | V |
|  | 1001 | Y |
|  | 1010 | Backspace |
|  | 1011 | * |
|  | 1100 | # |
|  | 1101 | NC |
|  | 1110 | NC |
|  | 1111 | NC |

It should be noted that a plurality of computer compatible code formats (e.g. both the ASCII and EBCDIC formats) can be represented in ROM 42. For example, additional banks of memory locations containing the alternative code formats can be included in ROM 42. The relative addresses of locations in the additional banks would be for example, analogous to those shown in Table II. The additional banks of memory locations can be accessed by additional address input bits cooperating with, for example, a manual switch 78.

The symbol codes from ROM 42 are applied to a conventional Universal Asynchronous Receiver-Transmitter (UART) 54. UART 54 provides a data interface between modem/translator 20 and computer 18. The symbol data from translator ROM 42 is applied in parallel to UART 54, and is latched by UART 54 in response to a data strobe signal. The data strobe signal is generated by the selected mode logic circuitry (44, 46, 48 or 50) and is applied to UART 54 through mode selection logic 52. The parallel data is then serially provided to computer 18 at terminal RD in accordance with the RS 232-C convention.

Computer 18 operates upon the transmitted data, and responsively generates a command word (op-code). The op-code is serially transmitted in accordance with RS 232-C convention, and received by UART 54 at terminal TD. UART 54 converts the serial command word from computer 18 into parallel form, and provides the respective bits of the command word on eight parallel output lines, collectively referred to as 56. In addition, UART 54 generates a "data available" signal, DA, each time a complete command from computer 18 is accumulated. UART 54 is initially cleared (reset), upon the powering up of the system, by a suitable power on reset circuit 80 and is clocked by a "baud rate" signal from a conventional oscillator circuit and divider chain (not shown). A signal indicative of the band rate is also provided as an output signal BR.

As will hereinafter be more fully explained, the operational sequence and mode control of modem/translator 20 are effected by computer 18 through the command op-codes transmitted to UART 54. UART 54 provides such op-codes, in parallel form, on output lines 56 to command decoder 31, and a speech synthesis network 58. Command decoder 31, in effect, derives the appropriate control signals from the op-codes to select the required operational mode and analog input and output channels.

As previously noted, input selector 28, when enabled, couples either DAA tip line DT or Touch Tone generator 32, chosen in accordance with the address signals from command decoder 31 to touch tone decoder 34. Similarly, the analog output of modem/translator 20 are selected by suitable output selector logic circuit 30.

Output selector 30, when enabled, couples the signals applied to one of four input terminals (IN A, IN B, IN C, and IN D), chosen in accordance with command address signals from command decoder 31, through summing amplifier 29 to the DAA tip line DT, for output through the telephone system. Output selector 30 is suitably formed of a "1 of 8 analog decoder" chip, such as a C04051BC. Inputs IN A and IN B of output selector 30 are receptive of respective audio tones, e.g. 2025 Hz and 1025 Hz, generated by a conventional dual tone generator 72. Inputs IN C and IN D to output selector 30 are receptive of DTMF signals generated by touch tone generator 32 and analog synthesized speech signals derived from speech synthesis network 58, respectively.

Speech synthesizer network 58, suitably comprises a speech synthesizer chip (e.g. an MM59104), cooperating with a read only memory (e.g. comprising one or more MM519104 chips). Speech synthesis network 58, in effect, maintains indicia of various sounds, compressed expressions, words, pauses etc., associated with human speech in read only memory. When enabled, the speech synthesizer chip accesses, in response to strobe signals applied thereto, particular stored indicia identified by address input signals and translates the indicia into an analog signal corresponding to the sound, etc. The address and strobe inputs of speech synthesis network 58 are coupled to parallel output lines 56, and to the data available (DA) line of UART 54, respectively. As will hereinafter be more fully explained, the enable signal to speech synthesis network 58 is provided by command decoder 31 upon generation of a specified op-code, and is maintained until one of various other op-codes are generated. During the interim, speech synthesis network 58 is enabled, and responsive to predetermined op-codes applied to address signals, generates analog synthesized speech signals. The analog speech signals are applied through a suitable amplifier and filter 74 to one input (IN D) of output selector 30.

Speech synthesizer 58 also generates a wait signal, indicative of network 58 being "in use". The wait signal is translated to a voltage level compatible with the RS 232 convention and provided at terminal CTS to computer 18 for timing purposes.

As previously mentioned, computer 18 effects the operational sequence and mode control of modem/translator 20 through respective command codes (op-codes) transmitted to UART 54. These op-codes are then, in effect, decoded by command decoder 31 to generate the appropriate command signals to the various operative elements. For example, op-codes may be assigned to the various functions as set forth in Table III below. The op-codes, while actually transmitted to UART 54 in binary form, are expressed in Table III as hexidecimal (hex) numbers for the sake of convenience. The symbol X in Table III, indicates that any hex digit can be present.

TABLE III

| COMMAND OP-CODE HEXADECIMAL | FUNCTION | |
|---|---|---|
| D 0 | SELECT MODE 0 | |
| D 1 | SELECT MODE 1 | |
| D 2 | SELECT MODE 2 | |
| D 3 | SELECT MODE 3 | |
| D 4 - DF | PAUSE | |
| E X | PAUSE | |
| F 2 | INPUT SELECT INPUT A | |
| F 7 | OUTPUT SELECT LOW TONE 1025 | |
| F 9 | OUTPUT SELECT HIGH TONE 2025 | |
| F 3 | OUTPUT SELECT DTMF GENERATOR 32 | |
| 1 X | Generate | DTMF 1 |
| 2 X | Generate | DTMF 2 |
| 3 X | Generate | DTMF 3 |
| 4 X | Generate | DTMF 4 |
| 5 X | Generate | DTMF 5 |
| 6 X | Generate | DTMF 6 |
| 7 X | Generate | DTMF 7 |
| 8 X | Generate | DTMF 8 |
| 9 X | Generate | DTMF 9 |
| A X | Generate | DTMF 0 |
| B X | Generate | DTMF * |
| C X | Generate | DTMF # |
| F F | ENABLE SPEECH SYNTH. NETWORK, SELECT OUTPUT D | |
| O O - 8F | SPEECH SYNTH. PHRASES (AFTER OP-CODE F F EXECUTED) | |
| F 1 | DISCONNECT ANALOG OUTPUT | |
| F 4 | INPUT SELECT B : SELF-TEST | |

Command decoder 31 suitably comprises a 4-bit register 62 of D type flip flops, suitable latched decoders 60 and 64, a four input NAND gate 68 and a D type flip flop 70.

Latched decoder 60 cooperates with mode selector 52 to provide operational mode control of modem/translator 20. Latched decoder 60 generates two bit control codes to mode selector logic circuitry 52 in response to specific corresponding op-codes (e.g. D0, D1, D2, D3) from computer 18. Once having generated a control code, latched decoder 60 latches the code until reset by a signal from computer 18 indicative of a new call (e.g. a "request to send" signal connection not shown).

Selector logic 52, couples the respective output terminals thereof to a particular set of input terminals (Set A, Set B, Set C, or Set D) identified by the 2-bit control code provided by latched decoder 60, as will hereinafter be more fully explained, the sets of input terminals are connected to the respective translation technique logic circuits 44, 46, 48 and 50, which provide the most significant bits of the address signals to ROM 42 and the data strobe signal to UART 54.

When "reset", latched decoder 60 generates a control code to mode selector 52 corresponding to a designated "default" mode. If desired, the default mode may be a "direct through" mode, wherein the 4-bit code generated by decoder 34 is passed without change to computer 18. This is accomplished by storing replicas of the 4-bit codes in respective memory locations, then providing the contents of the memory locations to computer 18. The memory location addresses for each 4-bit code would suitably include four least significant bits comprising the 4-bit code, with the remaining most significant bits tied high. Alternatively, any mode can be designated the default mode. In the preferred embodiment mode O (circuit 50) is designated the default mode.

D flip flop 70 provides for operation of register 62 and latched decoder 64 in synchrony with data reception from computer 18 by UART 54. The respective DA and BR signals generated by UART 54 are applied to the D and clock input terminals of flip flop 70 respectively. Accordingly, a positive going transition will occur in the Q output of flip flop 70 only when the data available signal DA first goes positive. The Q output of flip flop 70 is connected to the clock input of latched decoder 64 and, through an inverter (and delay where appropriate) to the clock input of register 62. The positive going transition in the Q output clocks latched decoder 64, and slightly thereafter, the inverted signal clocks register 62.

Register 62 provides address control signals to input selection logic 28 and to output selector logic 30. Register 62 includes four data inputs (D1-D4) four corresponding outputs ($Q_1-Q_4$), a clock input, a clear input (CLR), and an inhibit input. Unless inhibited, register 62 latches the signals present at the data inputs thereof in response to negative going transitions in the clock signal. When inhibited, register 62 maintains (stores) its present contents, i.e., the clocking function is disabled. The D inputs of register 62 are receptive of the four least significant bits of the op-code in UART 54. The inhibit input terminal is receptive of a hex F signal derived from latched decoder 64, as will be hereinafter more fully explained. Register 62 is initially cleared on power up by a master reset signal MR generated by "power on reset" circuit 80.

The four most significant bits of the op-code are applied to latched decoder 64. Latched decoder 64 provides control signals to touch tone generator 32 and to register 62. Latched decoder 64 is suitably a conventional 4-bit latched 4 to 16 line decoder such as a CD4514C. In response to the clock signal, latched decoder 64 latches the 4 most significant bits of the op-code, and generates a high level output signal on one of 16 lines, in accordance with the value of the latched four most significant bits. This signal is maintained until latched decoder 64 is again clocked upon completed reception of a new op-code by UART 54. The first 12 output terminals (hex 1-hex C) of latched decoder 64 provide input signals to Touch Tone generator 32 as will be described.

As noted above, the hex F output (corresponding to binary 1111) of decoder 64 is inverted and applied to the inhibit input of register 60. Accordingly, register 62, latches new data only when the four most significant bits of the op-code in UART 54 are equal to hex F (binary 1111).

The Q outputs of register 62 provide the address command signals to input selection logic 28 and output selection logic 30. Three bits, suitably the three most significant bits ($Q_2-Q_4$), are applied to the address input of both input selector 28 and output selector 30. The $Q_1$ output e.g. least significant bit, is connected to the inhibit terminal of input selector 28 and, through an inverter 66, to the inhibit terminal of output selector logic 30. Thus, mutually exclusive operation of input selector 28 and output selector 30 is established.

NAND gate 68 acts as a decoder to enable speech synthesis network 58 only during periods wherein register 62 latches a hexadecimal F. The respective input terminals of NAND gate 68 are coupled to the Q output terminals of register 62. The output terminal of NAND gate 68 is connected to the inhibit (INHIB) terminal of speech synthesis network 58. Since register 62 is enabled to latch a new input only when the four most significant bits of the op-code are equal to hex F, a hex F value will be latched in register 62 only in response to a hex FF op-code in UART 54. However, the hex F latched in register 62 will be retained until generation of a succeeding op-code with four most significant bits of value hex F. Accordingly, NAND gate 68, in effect, enables speech synthesis network 58 upon generation of a hex FF op-code and continues to enable speech synthesis network 58 until the next successive op-code having a value hex FX (where X is any digit) is generated. During the interim, speech synthesis network 58 is responsive to the op-codes received by UART 54, having most significant bits of value other than hex F, and generates corresponding analog synthesized speech signals.

With reference to FIGS. 1 and 2, the overall operation of modem/translator 20 will now be described. When a ring signal is applied DAA 22 by the telephone system, a ring indicator signal is provided to computer 18 at terminal DCD of conversion circuitry 24. The ring indicator signal, in effect, initiates an operational routine in computer 18. Computer 18 generates a "request to send" (RTS) signal to DAA 22 (typically through voltage level conversion and delay circuitry 24). The request to send signal RTS, causes DAA 22 to couple the telephone system tip and ring lines to the DAA tip line DT and ring line DR, respectively (suitably through a transformer and relay). Modem/translator 20 is thus effectively coupled into the telephone network. The RTS signal may also be used to clear latched decoder 60.

A synthesized speech acknowledgment and/or instruction is then, if desired, transmitted to the user at telephone set 10 (FIG. 1). To effect such an operation, computer 18 first generates the appropriate operational code (e.g. hexadecimal FF) to enable speech synthesis network 58. The hex FF op-code also effects the coupling of speech synthesis network 58 to the DAA tip line DT, by enabling output selector 30 and identifying the appropriate input terminal of output selector 30 (IN D). More particularly, computer 18 transmits op-code in serial binary form (RS232-C) to UART 54. The serial bits are accumulated in UART 54, and provided in parallel form on output lines 56. The four least significant bits of the op-code (e.g. hex F) are applied to the respective D inputs of register 62. Similarly the four most significant bits are applied to latched decoder 64. When the complete op-code has been received by UART 54, UART 54 generates a data available signal DA, applied to the D input of flip flop 70. Upon the next positive going transition in the band rate signal BR, from UART 54, flip flop 70 is clocked and the Q output of flip flop 70, in turn, clocks latched decoder 64. Latched decoder 64, decodes the most significant bits of the op-code and generates (and latches) a signal on the hex F output thereof. The hex F signal from latched decoder 64, in effect, enables the clocking function of register 62. Register 62, accordingly, latches the hex F presented by the four least significant bits of the op-code. The Q4, Q3, Q2 and Q1 outputs of register 62 therefore assume the values 1,1,1,1, respectively.

As previously noted, the Q1 output of register 62 is coupled to the inhibit terminal of input selector 28 and through inverter 66 to the inhibit input of output selector 30. The high level signal provided by the Q1 output of register 62 effectively inhibits input selector 28 and enables output selector 30. The remaining bits, Q2, Q3 and Q4, that is 1, 1, 1, identify and effect an output connection to input IN D, associated with speech synthesizer 58.

The hex F at the Q outputs of register 62 also cause NAND gate 68 to generate allow level signal to the inhibit terminal of speech synthesis network 58. Accordingly, speech synthesis network 58 is enabled with respect to successive op-codes having four most significant bits of values other than hex F.

Computer 18 then generates a sequence of op-codes corresponding to the desired acknowledgment and/or instruction to the user. Each of the op-codes corresponds to the address of a component word or phrase of the message to be synthesized. When the op-code is received by UART 54 and provided on lines 56, a data available signal DA is generated to strobe the op-code into the speech synthesizer chip. The synthesizer chip then accesses the identified associated memory location and generates a corresponding analog synthesized speech signal. Upon strobing the op-code, speech synthesis network generates an indicia of operation on line CTS to computer 18. When the synthesis of the component word or phrase is completed, the signal on line CTS informs computer 18, and the op-code corresponding to the next successive component word or phrase is transmitted, until the message is complete. Thus, speech synthesis network 58, in response to the sequence of op-codes, generates an analog signal corresponding to the desired phrase. For example, a phrase can be transmitted as follows: "Hello. System ready. Please enter mode."

After acknowledgment has been transmitted, computer 18 transmits to UART 54 the op-code (e.g. hexadecimal F2) to enable input selector 28 and couple the DAA tip line DT to touch tone decoder 34. When the complete op-code (hex 2) is received by UART 54 and provided on output lines 56, the data available signal is generated, and flip flop 70 is set. The four most significant bits (hex F) are decoded by latched decoder 64 to enable register 62 to latch the four least significant bits of the op-code (0010). The low value output from Q1 of register 62 inhibits output selector 30 and enables input selector 28. The content of bits Q4, Q3 and Q2 (0, 0, 1) identify input A as the selected input. Speech synthesis network 58 is inhibited by the output of NAND gate 68. Touch tone generator 32 and dual tone generator 72 are, in effect, free running, that is, constantly generating output signals. However, those elements are, in effect, isolated from the remainder of the circuitry when not selected by output selector 30 or (in the case of touch tone generator 32) input selector 28.

After tip line DT has been coupled to decoder 34, the system is ready to receive DTMF signals from telephone set 10 indicative of a desired operational mode/translation technique. As previously noted, mode selection is effected by mode selector circuit 52 under the control of latched decoder 60. Latch decoder 60 responds to certain specified op-codes on output lines 56, and generates two bit control signals to input selector mode logic 52, identifying a specific set of mode selector input terminals.

As previously noted, latched decoder 60 is initially cleared (or preloaded), suitably at the same time that the connection to the telephone system is effected (connections not shown). Clearing latched decoder 60 causes mode selector 52 to connect the logic circuit corresponding to designated default mode into the operative circuit.

Accordingly, the user at the telephone set 10 keys in an entry (in accordance with the default mode translation technique) corresponding to the desired mode. Assume for the purposes of explanation that the entries for the respective modes are single digit numerics 0, 1, 2, and 3, corresponding to modes 0, 1, 2 and 3, respectively.

When the user keys in the entry indicative of the desired mode, e.g. 0, 1, 2 or 3, the associated DTMF signal is transmitted through the telephone system, coupled to modem/translator through DAA 22, and routed to touch tone decoder 34. Touch tone decoder 34, in turn, generates a 4-bit code indicative of the value of the DMTF signal, together with the data valid signal DV. The 4-bit code is latched in register 40 and applied as the four least significant bits of the address command signal to translator ROM 42. The default mode logic circuit provides the remaining most significant bits. Translator ROM 42 accordingly provides output signals indicative of the contents of the identified memory location, i.e. the symbol code corresponding to the mode number.

The code representation of the mode number from ROM 42 is then loaded into UART 54 in response to a strobe signal from the designated default mode logic circuitry. The data code is then transmitted to computer 18.

Computer 18 operates upon the data, then transmits the op-code (e.g., D0, D1, D2, D3) corresponding to the desired mode selection to UART 54. UART 54, in turn, provides the op-codes on lines 56 to latched decoder 60. Latched decoder 60 then generates the appropriate control signals to the mode selector 52 to couple the selected mode circuit, 44, 46, 48 or 50 into the operational system of modum/translator 20.

A further synthesized speech acknowledgment/instruction is then suitably generated. Computer 18 generates the op-code (e.g. hex FF) to enable speech synthesizer 58, inhibit input selector 28 and couple the speech synthesizer to tip line DT through output selector 30. The appropriate sequence of op-codes are then generated to cause speech synthesizer network 58 to generate the appropriate phrase, for example, "Thank you. Please enter data."

After transmission of the acknowledgment/instruction, computer 18 generates the op-code to inhibit output selector 30 and to re-effect the connection between tip line DT and decoder 34 through input selector 28. Data may then be keyed in at telephone set 10, in accordance with the selected translation technique. The DTMF transmission is routed to touch tone decoder 34, which generates the corresponding 4-bit code. The 4-bit code is latched in register 40 and applied as the four least significant bits of the address command to translator ROM 42. The selected translation technique circuitry provides the remaining most significant bits of the address input and generates a strobe signal to cause the output of the identified ROM location to be loaded into UART 54 upon completion of each transmission sequence corresponding to a symbol. UART 54 transmits the symbol code word to computer 18. Computer 18, in turn generates a sequence of op-codes to enable speech synthesizer network 58 and effect the connection to the tip line DT through output selector 30. Appropriate op-codes are then generated to provide a synthesized speech signal corresponding to the symbol transmitted. Thus, alphanumeric data can be transmitted through the telephone system using a standard touch tone key pad.

The above sequence is continued until a complete data entry is received by computer 18, causing computer 18 to effect some operation, such as store the data entry, activate some external device, make some computation and generate a synthesized speech response, or the like. However, the above sequence can also be terminated by the user "hanging up" telephone set 10, or by computer 18 if no valid character is received within a specified period. If desired, a warning message can be transmitted to the user prior to terminating the connection. Similarly, if desired the connection can be broken by computer 18 in response to a specified "abort character group" entered from telephone set 10.

As previously noted, modum/translator 20 provides for use of a plurality of different modes translation techniques for use with varying type of data.

In the preferred embodiment, three different translation techniques are provided in addition to the "direct through" mode: the so-called delayed depression technique, and two new translation techniques.

As previously noted, the "direct through" mode of operation entails, in effect, transmitting the four bit code generated by Touch Tone decoder 34 to computer 18 without change. Replicas of the 4-bit codes are stored in respective sequential memory locations. The four least significant bits of the address of the location corresponding to the 4-bit code are equal to the 4-bit code. The most significant bits of the address are set at a predetermined value, e.g., all high. A suitable circuit for effecting "direct through" operation is generally designated 44 in FIG. 1. Logic circuit 44 provides high level signals to the A1, A2 and A3 inputs of mode selector 52 for application as the most significant bits of the address to ROM 42. The $\overline{DV}$ signal is applied to mode selector input A4 for application as the data strobe to UART 54.

When a key is depressed at telephone set 10, a DTMF signal is transmitted to modem/translator 20 and routed to touch tone decoder 34. Touch tone decoder 34 generates a 4-bit code which is latched by register 40, and applied as the four least significant bits of the address to ROM 42. Since the most significant bits of the address are fixed, the relative address of the ROM location corresponding to each symbol is specified by the individual 4-bit codes per se. Each DTMF signal corresponds to a complete signal transmission, so, the strobe signal is generated upon release of each depressed key. The symbol codes are thus latched by UART 54 for transmission to computer 18.

As previously noted, the delayed depression technique entails discriminating between long and short depressions of the keys. An alphabetic character is represented by first depressing a key indicative of the placement division of the alphabetic character (e.g. 1, for division 1, 2 for division 2, 3 for division for 3) for a period longer than a preset limit, e.g. 290 milliseconds, then depressing the particular key inscribed with the alphabetic character for a duration less than the preset limit. Return to the numeric mode is effected by depressing a designated key, e.g. the # key. The delayed depression translation technique is easily adapted for providing representations of both upper case and lower case letters. Specifically, placement divisions 1, 2 and 3 can be considered the lower case, and additional corresponding divisions 4, 5 and 6 can be created to represent the upper case letters. Upper case letters would then be represented by first depressing the key corresponding to the appropriate upper case division (4, 5, or 6) for a period longer than 290 milliseconds, then depressing (short duration) the key inscribed with the particular letter. A circuit 46 implementing such modified delayed depression translation technique is shown in FIG. 3.

Figure 3:
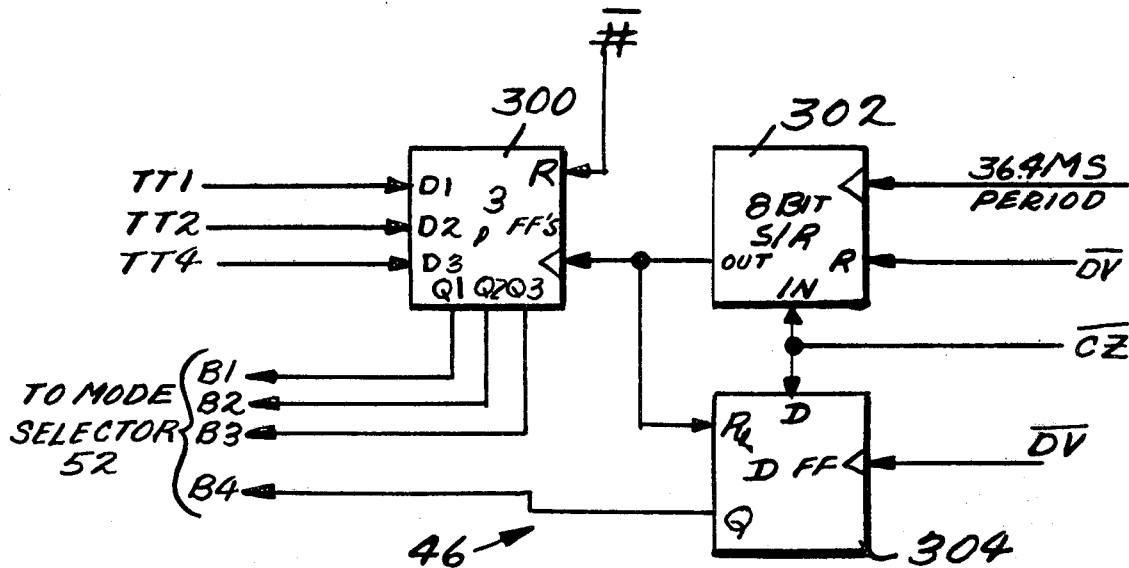
FIGS. 3, 4 and 5 are block schematic diagrams of circuitry for effecting respective translation techniques.

Referring now to FIG. 3, circuit 46 comprises a 3-bit register 300 of D flip flops, an 8-bit shift register 302 and a fourth D flip flop 304.

Shift register 302 provides an output signal only if the DTMF signal generated by depressing the key on touch pad 12 (FIG. 1) is longer than 290 milliseconds. Shift register 302 is clocked by a signal having a 36.4 millisecond period. The $\overline{CZ}$ signal from decoder 38 is applied as an input signal to shift register 302, and shift register 302 is reset by the $\overline{DV}$ signal from touch tone decoder 34. $\overline{CZ}$ maintains a high level during such periods as touch tone decoder 34 generates a valid 4-bit code. Accordingly, $\overline{CZ}$ will assume a high level in response to the depression of a touch tone key, and will remain high until the key is released. $\overline{DV}$, on the other hand, provides a positive going transition upon the release of the touch tone key. It should be noted that the positive transition in $\overline{DV}$ occurs slightly before the negative going transition $\overline{CZ}$ because of the delays inherent in the circuitry. Accordingly, when the key is depressed, $\overline{CZ}$ provides a high level input to shift register 302. If the key remains depressed for more than eight 36.4 millisecond periods i.e., 290 milliseconds, a high level output will be provided at the output of shift register 302. In the event that the key is released before expiration of a 290 millisecond period, a positive going transition signal $\overline{DV}$ will reset shift register 302, preventing a high level output.

Register 300 selectively latches the three least significant bits of the 4-bit code generated by touch tone decoder 34. The three least significant bits (TT1, TT2, TT4) are applied to the respective D inputs of register 300. Register 300 is clocked by the output of shift register 302. Register 300 is reset by positive going transitions in the $\overline{\#}$ signal generated by decoder 38. Register 300 thus latches the 3 least significant bits of the code generated by Touch Tone decoder 34 only in response to signals which generate an output from shift register 302, i.e., which are longer than 290 milliseconds.

Flip flop 304 is utilized to provide the strobe signal to UART 54 only in response to DTMF signals less than 290 milliseconds in duration. The $\overline{CZ}$ and $\overline{DT}$ signals are applied as the D and clock inputs, respectively, to flip flop 304. The strobe signal to UART 54 is provided at the Q output of flip flop 304. Flip flop 304 is reset by the output of shift register 302. As previously noted, $\overline{CZ}$ goes high upon depression of the touch tone key. $\overline{DV}$, on the other hand, provides a positive going transition when the key is released. $\overline{CZ}$, because of inherent delays in the circuitry, remains high until slightly after the transition in $\overline{DV}$. Accordingly, each time the key is released, the Q output of flip flop 304 goes high, unless reset, causing a strobe signal to be generated to UART 54. However, if the duration of the DTMF signal is greater than 290 milliseconds, the output of shift register 302 goes high, resetting flip flop 304, and thereby preventing generation of the strobe signal when the key is released.

In operation, when a key is depressed for more than 290 milliseconds, the three least significant bits of the corresponding code generated by touch tone decoder 34 is latched in register 300. Register 300 thus provides signals at its Q outputs indicative of the placement division (numeric, 1, 2, 3, 4, 5, or 6). The placement division code is provided at inputs B1, B2 and B3 of mode selector 52 for application as the most significant bits of the address signals to ROM 42. Since flip flop 304 is reset, no strobe signal is generated at that time. The key inscribed with the particular character to be transmitted is then depressed for a period less than 290 milliseconds. Touch tone decoder 34 generates a corresponding 4-bit code which is latched in register 40 (FIG. 2). When the key is released, a positive going transition occurs in signal $\overline{DV}$, causing flip flop 304 to generate a data strobe signal at input B4 of mode selector 52 for application to UART 54. Application of the strobe signal to UART 54 causes it to be loaded with the contents of the ROM location identified by the 3-bits provided by register 300 and the four bits provided by register 40 (FIG. 2).

The present invention also provides an alternative translation technique which may be advantageous for entry of certain types of data. In accordance with this new translation technique, alphabetic characters are transmitted from telephone set 10 by depressing a designated key (e.g. *) a number of times equal to the relative placement of the inscription of the character on the key (i.e. the placement division of the alphabetic character), followed by depression of the key on which the character is inscribed. A return to the numeric mode is effected by depression of a second designated key (e.g. #). A circuit 48 for implementing such first alternative translation technique is shown in FIG. 4.

Figure 4:
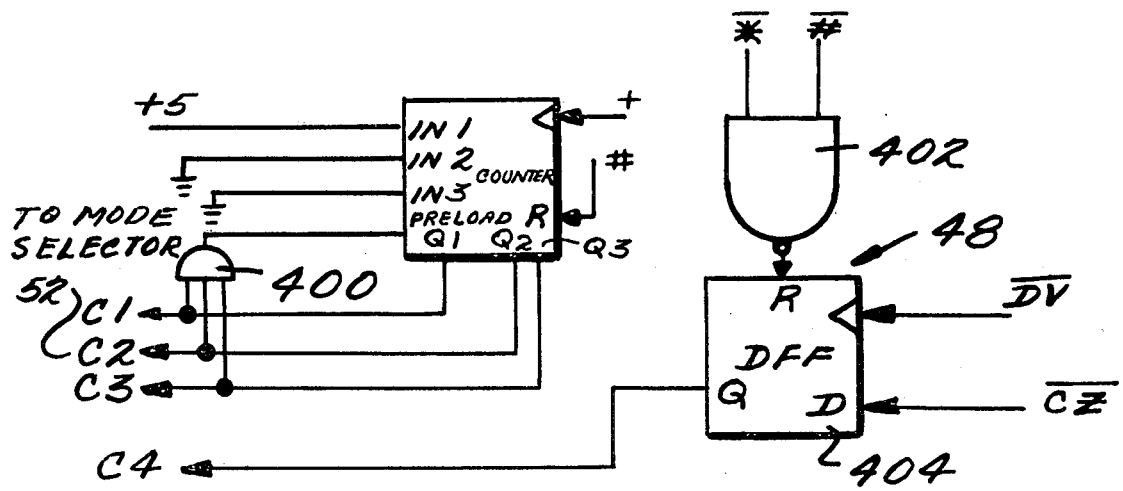

Referring now to FIG. 4, circuit 48 comprises a conventional 3-bit presetable counter 400, a 2-input NAND gate 402, an D type flip flop 404 and a 3-input AND gate 406.

Counter 400 provides a count indicative of the number of times that the * key is depressed for a given entry, i.e. the placement division of the transmitted character. Counter 400 is clocked and reset by the * and # signals from decoder 38 (FIG. 2), respectively. The respective Q outputs of counter 400 are coupled to the respective C inputs of mode selector 52 (FIG. 2).

NAND gate 402 and flip flop 404 cooperate to generate UART data strobe signal (FIG. 2) in response to entry of any symbol from telephone set 10 (FIG. 1) other than * or #. The respective input terminals of NAND gate 402 are receptive of the $\overline{*}$ and $\overline{\#}$ signals from decoder 38 (FIG. 2). The output of NAND gate 402 is coupled to the reset terminal of flip flop 404. The $\overline{DV}$ from touch tone decoder 34 (FIG. 2) and $\overline{CZ}$ signal from decoder 38 are applied to the clock and D inputs of flip flop 404, respectively. The Q output of flip flop 404 is applied to the C4 input of mode selector 52 for application as the data strobe to UART 54. As previously noted, signal $\overline{CZ}$ assumes a high value upon depression of any touch tone key, and remains high until slightly after the key is released. Signal $\overline{DV}$ provides a positive going transition upon release of the key. Accordingly, unless inhibited (reset) flip flop 404 is clocked each time a key is released, causing the Q output thereof the assume a high level. However, NAND gate 404 generates a high level signal each time the * key or # key is depressed, to reset (inhibit) the flip flop. Accordingly, flip flop 404 generates a strobe signal in response to all entries other than * or #.

AND gate 406 provides for "wrap around" operation, whereby a further (seventh) depression of the * key, after indicating placement division six, effects a return placement division one. The respective input terminals of AND gate 406 are coupled to the respective Q outputs of counter 406. The output signal of AND gate 406 is applied to the present terminal of counter 400. AND gate 406, in effect, acts as a decoder and generates a positive going transition to effect an immediate preset of counter 400, when the count reaches the value binary 111. The positive going transition causes counter 400 to be preset with a binary 001. Accordingly, incrementing counter 400 seven times results in a count indicative of division 1.

By way of example, the entry of the character "C", with circuit 48 coupled into the operative system by mode selector 52, will be explained. Reference is made to FIGS. 1, 2 and 4. To enter "C", the * key at telephone set 10 is depressed 3 times, corresponding to placement division 3. Each time the * key is depressed, the corresponding DTMF signal is generated by telephone set 10 and transmitted to modem/translator 20. The DTMF signals are applied to touch tone decoder 34, which generates the corresponding 4-bit code. Decoder 38 responsively generates the * signal. Each * signal generated by decoder 38, increments counter 400. Accordingly, a count (011) indicative of placement division three is accumulated in counter 400 and applied as the most significant bits of the address to ROM 42. The key (numeric 2) inscribed with "C", is then depressed. The corresponding DTMF code is transmitted to modem/translator 20. Touch Tone decoder 34 generates the corresponding 4-bit code (0010). The 4-bit code is latched in register 40 and applied as the least significant bits of the address signal to ROM 42. When the 2 key is released, flip flop 404 generates a strobe signal to UART 54, causing UART 54 to latch the contents of ROM memory location 0110010, which contains the computer compatible symbol code for "C".

Modem/translator 20 provides a further alternative translation technique which is particularly advantageous for entry of various other types of data. In accordance with this second alternative translation technique an alphabetic mode is entered by depressing a designated key (e.g. *). Individual characters are then represented by multiple depressions of the single particular key on which the character is inscribed. The key is depressed for short durations once for each placement division preceeding the placement division of the character. When the number corresponding to the placement division of the character is reached, the key is depressed for a period longer than a predetermined duration, e.g. 290 milliseconds. A return to the numeric mode is effected by depressing a second designated key (e.g., #). A circuit 58 implementing such second alternative translation technique (mode 0) is shown in FIG. 5.

Figure 5:
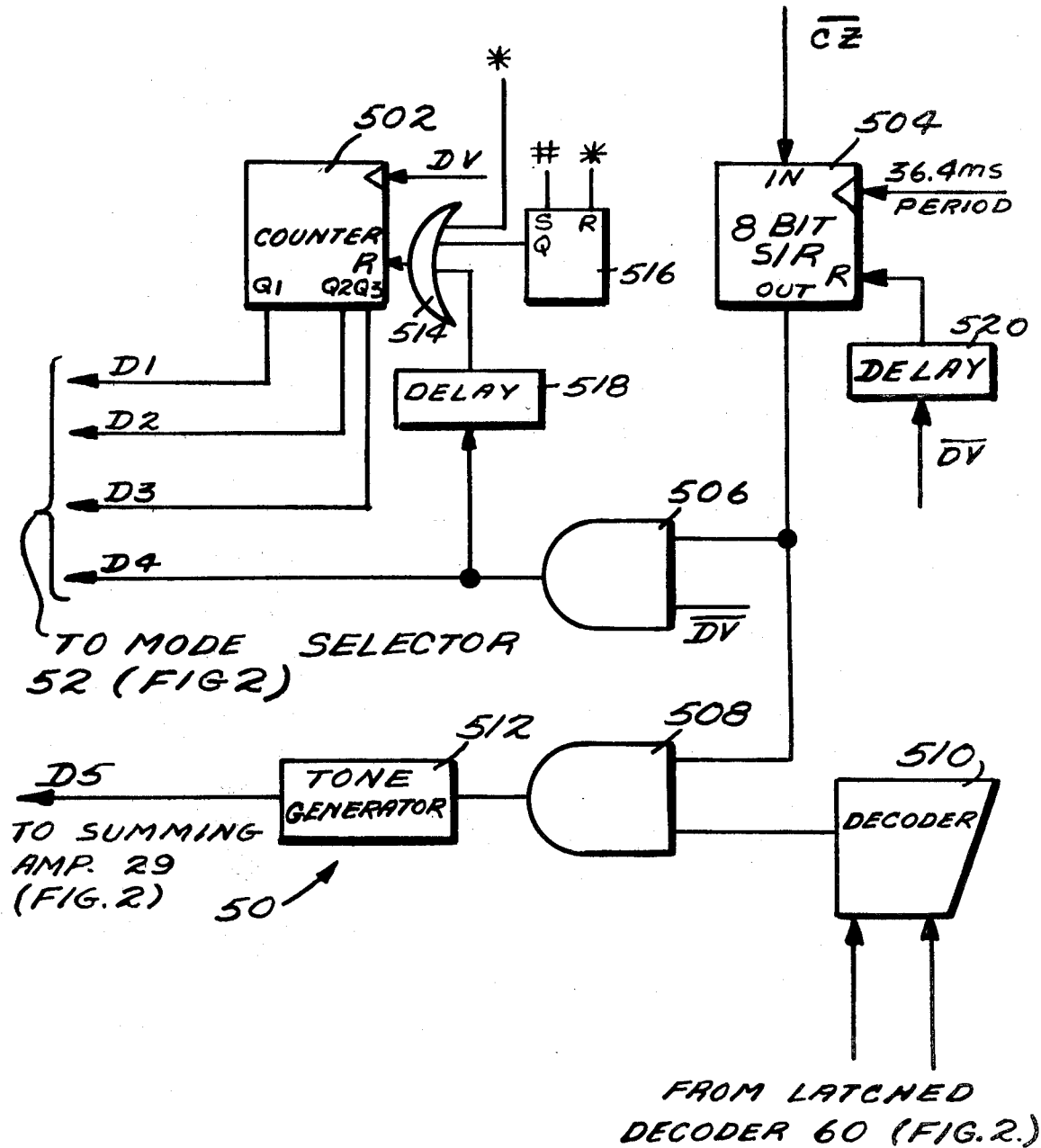

Referring now to FIG. 5, circuit 50 comprises a 3-bit counter 502, and 8-bit shift register 504, respective 2-input AND gates 506 and 508, suitable decoder logic 510, a tone generator 512, a 3-input OR gate 514, a R-S flip-flop 516 and respective delay circuits 518 and 520.

Shift register 504 generates a high level output signal only in response to key depressions longer than 290 milliseconds. The clock, reset, and input terminals of shift register 504 are receptive of a 36.4 millisecond period clock signal, the $\overline{DV}$ signal (delayed) from decoder 38 (FIG. 2) and the $\overline{CZ}$ signal from decoder 38, respectively.

Counter 502, when enabled, accumulates a count indicative of the number of times a key (other than * or #) is depressed. Signal DV from touch tone decoder 34 goes high substantially immediately upon depression of any touch pad key, incrementing counter 502 in response to both short duration and long duration depressions of keys. Thus, the count accumulated by counter 502 is indicative of the placement division of the transmitted symbol. Counter 502 is reset after each data strobe signal (appropriately delayed) to facilitate entry of the next character.

Counter 502 is also reset, through OR gate 514, in response to the * signal. This prevents counter 502 from being incremented in response to depression of the * key, and ensures that counter 502 is properly initialized for the succeeding alphabetic entries.

R-S flip flop 516 provides numeric-alpha mode control of circuit 50. Flip flop 516 is set and reset by the # and * signals, respectively. The Q output of flip flop 516 is applied to the reset input terminal of counter 502 (through OR gate 514). Thus, when the * key is depressed, a low level signal is applied to the reset terminal of counter 52, enabling the counter, and establishing the alpha mode of operation. Conversely, when the # key is depressed, flip flop 516 generates a high level signal to reset counter 502. Counter 502 is held at a zero value count, i.e. the numeric mode is maintained, until flip flop 516 is again reset in response to a depression of * key at telephone set 10.

As noted above, a key depression longer than 290 milliseconds, signifies that the key has been depressed a number of times corresponding to the placement division of the particular character and that the symbol transmission is complete. Shift register 504 and AND gate 506 cooperate to generate a strobe signal only in response to key depressions longer than 290 milliseconds. More particularly, if the DTMF signal resulting from the key depression is less than 290 milliseconds, shift register 504 will be reset by the $\overline{DV}$ signal, and does not enable AND gate 506. Thus, short duration DTMF signals (other than * or #), increment counter 502 (when enabled), but do not result in strobe signals to UART 54. However, a DTMF signal of more than 290 milliseconds results in a high level output signal from shift register 504, enabling AND gate 506 with respect to positive going transitions in signal DV. Thus, when the key is released after the long duration depression signifying the completed transmission, a strobe pulse is generated causing UART 54 to latch the contents of the ROM location corresponding to the address signals.

Decoder 510, AND gate 508 and tone generator 512 cooperate to provide a tone feedback signal to the user, signifying that a key has been depressed for the requisite 290 milliseconds period. Decoder 510 is responsive to the output of latched decoder 60 (FIG. 2) indicative of the particular mode selected, and generates a high level signal to enable AND gate 508 only when mode selector inputs D are selected. AND gate 508 generates a high level signal in response to the high level input provided by shift register 504 to activate tone generator 512 until such time as the key is released and shift register 504 reset. The output signal from tone generator 512 is applied through summing amplifier 29 (FIG. 2) to the tip line DT. Thus, an audible tone is transmitted to the user at telephone set 10.

For example, the character "C" may be transmitted from telephone set 10 to computer 18 as follows, assuming circuit 50 to be operatively connected into modem/translator 20 by mode selector 52. The user at telephone set 10, first depresses (short duration) the * key to effect "alpha mode" operation of circuit 50. Telephone set 10 transmits the corresponding DTMF signal to modem/translator 20. The DTMF signal is applied to touch tone decoder 34, which generates the corresponding 4-bit code. Decoder 38 responsively generates a * signal, to reset flip flop 516, and thus enable counter 502. Counter 502 is, however, momentarily reset by the * signal, and therefore is initialized to zero for the succeeding alphabetic entries.

The user at telephone set 10 then depresses the 2 key (on which "C" is inscribed), three times; twice for short durations, the once for a duration longer than 290 milliseconds. Each time the 2 key is depressed, telephone set 10 transmits the appropriate DTMF signal to modem/translator 20; Touch Tone decoder 34 generates the corresponding 4-bit code and data valid signal DV; decoder 38 responsively generates a $\overline{CZ}$ signal; and register 40 latches the 4-bit code (0010). In each instance, counter 502 is incremented by the DV signal. Thus, a count 011 is accumulated. However, with respect to the short duration depressions, shift register 504 is reset by the DV signal transition generated upon release of the key) before a high level signal can be shifted through the register. Accordingly no strobe signal is generated in response to the short depressions. Conversely, the third depression, longer than 290 milliseconds, permits the high level to be shifted through register 504 to enable AND gates 506 and 508. Accordingly, when a positive going transition occurs in $\overline{DV}$ upon release of the key, a strobe signal is generated.

Since latched decoder 60 is here assumed to generate the mode selector command code corresponding to circuit 50, decoder 510 generates a high level signal to AND gate 508. Accordingly, when a high level signal is provided by shift register 504, tone generator 512 is activated. An audible tone is thus applied to the DT line and transmitted to the user at telephone set 10, indicating that a key has been depressed for a sufficiently long period (and that an entry has been completed). The user then releases the 2 key, causing a positive going transistor to occur in $\overline{DV}$. A strobe signal is thus generated to UART 54, causing UART 54 to latch the contents of the ROM 42 location corresponding to the address designated by the count in counter 502 (011) and the contents of latch 40 (0010). UART 54 then transmits the symbol code to computer 18. Computer 18 then generates the appropriate sequence of op-codes to effect a synthesized speech representation of "C", as previously described.

It should be appreciated that the above described embodiment of the present invention provides a particularly versatile system for transmitting alphanumeric data using a standard telephone set. Hardware for effecting any one of a plurality of different specific translation techniques can be selected by the user to facilitate entry of the particular type of data to be transmitted. In addition, the "direct through" mode of operation permits other translation techniques or codes to be affected by computer 18.

Further, provisions for self testing the system are provided. Computer 18 can effect a connection between touch tone generator 32 and touch tone decoder 34 through input selector 28 (op-code hex F4). Touch tone generator 32 can then be made to generate a predetermined sequence of DTMF signals (op-codes 1X-CX, X being any hex digit). The responses of modem/translator 20 to the known sequence of DTMF signals can be used as a diagnostic tool.

Touch tone generator 32 can also be used by computer 18 to originate a telephone connection to a given telephone set.

Further, the above described embodiment of modem/translator 20 is particularly suited for very large scale integration (VLSI) in a relatively small number of custom chips. For example, input selector 28, output selector 30, command decoder 31, decoder 38, register 40, mode selector 52, dual tone generator 72 and circuits 44, 46, 48 and 50, can be combined in a small number of VLSI custom chips.

It should also be appreciated that latched decoders 64 and 60, NAND gate 68 and flip flop 70 of command decoder 31, latch 40, mode selector 52 and circuits 44, 46, 48 and 50 can be replaced by a conventional microprocessor system such as a CPU (e.g. MC6802), and associated data bus, buffer, and PROM chips. Suitable output decoder circuits would derive enable signals for the various components of modem/translator 20 from the microprocessor output signals.

It will be understood that while various conductors/connections are shown in the drawings as a single line or set of lines, they are not so shown in a limiting sense and may comprise a different number of conductors/connectors as is understood in the art.

Further the above description is of preferred exemplary embodiments of the present invention and the invention is not limited to the specific forms shown. For example, while the preferred embodiment is responsive to DTMF signals, from the telephone set 10, modem/translator 20 can be adapted to any modulation or signaling scheme used for transmitting the interconnection supervisory data from telephone set 10, such as, for example pulse (make and break) coding or FSK coding.

To accommodate a different telephone signal transmission scheme, touch tone decoder 34 need only be replaced by an appropriate decoder. Similary, while the respective translator circuits 46, 48 and 50, utilize a common bank of memory locations in ROM 42, different banks of locations can be provided for the respective translation circuits. In such case the respective translation circuit would be such that the most significant bit provided for a given placement division would be different. These and other modifications may be made in the design and arrangements of the elements without departing from the spirit of the invention as expressed in the appended claims.

What is claimed is:

1. A system of the type responsive to signals from a telephone set, said signals including a plurality of distinct interconnection supervisory signals, said system including translation means for converting said supervisory signals into a computer compatible code, and means for transmitting respective computer compatible codes to a computer device, said translation means comprising:

decoder means, responsive to said signals from said telephone set, for generating a first digital code word indicative of the particular supervisory signal present in said signal from said telephone set;

a plurality of translator means, each translator means responsive to said telephone signals and for generating a respective second code word indicative of different predetermined sequences of said supervisory signals;

memory means, responsive to address signals applied thereto and including at least one individually addressable location corresponding to each symbol in said computer compatible code containing indicia of the corresponding code symbol, for generating an output signal indicative of the contents of an addressed location therein in accordance with said address signals;

means for applying said first code word to said memory means as a portion of said address signal;

selector means, responsive to control signals applied thereto, for selecting one of said plurality of translator means, and applying the second code word generated by said selected translator means to said memory means as another portion of said address signal; and means, responsive to said memory means output signals and a strobe control signal applied thereto, for selectively transmitting indicia of said symbol code to said computer.

2. A system of the type responsive to a set of supervisory signals from a telephone set, each of said supervisory signals being capable of presentation to the system for at least two distinct durations, said system including translation means for converting sequences of said supervisory signals into a digital code for application to a utilization device; the improvement wherein said translation means comprises:

decoder means, response to said supervisory signals, for generating a first digital code word corresponding to the particular supervisory signal presented to the system;

means for developing a count indicative of the number of successive supervisory signals generated in a sequence, the end of said sequence being signified by presentation to the system of a supervisory signal of a predetermined one of said distinct durations;

memory means, responsive to address signals applied thereto and including at least one addressable location corresponding to each symbol in said digital code containing indicia of said symbol, for generating an output signal indicative of the contents of an addressed location therein in accordance with said address signals;

means for applying said first code word and said count together to said memory means as said address signal;

means, responsive to signals indicative of said supervisory signals, for generating a strobe signal in response to supervisory signals of said predetermined one of said distinct durations; and means, responsive to said strobe signal for selectively applying said memory means instantaneous output signal to said utilization device.

3. The system of claim 1, wherein said system further includes means, responsive to said memory means output signals, for generating audible feedback signals to said telephone set, indicative of said symbol code transmitted to said computer.

4. The system of claim 3 wherein said audible feedback signals constitute a synthesized speech signal corresponding to said symbol.

5. The system of claim 1 wherein said supervisory signals are DTMF signals.

6. The system of claim 1 further comprising:
means, responsive to operation control signals from said computer, for generating said control signals to said selector means.

7. The system of claim 1 wherein a first of said plurality of translator means comprises:
a means for generating a second code word indicative of a predetermined constant; and
means for generating said strobe control signal to said means for selectively transmitting at the end of said particular supervisory signal present in said signal from said telephone set.

8. The system of claim 7, wherein said memory means includes at least one individually addressable location corresponding to each of said first code words containing indicia of said first code word, the address of said corresponding memory being specified by said first code word and said predetermined constant.

9. The system of claim 8, wherein said selector means includes means for selecting said first translator means in the absence of contrary control signals applied to said selector means.

10. The system of claim 1, wherein one of said plurality of translator means comprises:
first detector means, for generating latch command signals indicative of the occurrence of relatively long duration supervisory signals having durations longer than a predetermined period;
latch means, responsive to said latch command signals, for responsively storing indicia of at least a portion of said first code word corresponding to said long duration supervisory signals for application to said memory means as said second code word; and
means, response to relatively short duration supervisory signals, for responsively generating a strobe control signal to said means for selectively transmitting, to effect transmission of the symbol code indicia from the instantaneously addressed location in said memory means.

11. The system of claim 10, wherein said latch means includes means responsive to a predetermined particular supervisory signal, for selectively resetting said latch means stored indicia to a predetermined count.

12. The system of claim 11 wherein said predetermined particular supervisory signal is a DTMF signal associated with a # key of said telephone set.

13. The system of claim 7, wherein a second of said plurality of translator means comprises:
first detector means, for generating latch command signals indicative of the occurrence of relatively long duration supervisory signals having durations longer than a predetermined period;
latch means, responsive to said latch command signals, for responsively storing indicia of at least a portion of said first code word corresponding to said long duration supervisory signals for application to said memory means as said second code word; and
means, responsive to relatively short duration supervisory signals, for responsively generating a strobe control signal to said means for selectively transmitting, to effect transmission of the symbol code indicia from the instantaneously addressed location in said memory means.

14. The system of claim 13, wherein said latch means includes means responsive to a predetermined particular supervisory signal, for selectively resetting said latch means stored indicia to a predetermined count.

15. The system of claim 1, wherein one of said plurality of translator means comprises:
counter means, responsive to signals indicative of a predetermined first particular supervisory signal, for generating a count indicative of the number of sequential occurrences of said first particular supervisory signal in said signal from said telephone set, said count being applied to said memory means as said second code word;
and
means, responsive to signals indicative of a predetermined set of particular supervisory signals not including said predetermined first particular supervisory signal, for generating said strobe control signal to said means for selectively transmitting in accordance with the occurrence of any of said set of supervisory signals in the signal from said telephone set, to effect transmission of the symbol code indicia from the instantaneously addressed location in said memory storage.

16. The system of claim 15 wherein said counter means includes means responsive to signals indicative of a predetermined second particular supervisory signal not in said set of supervisory signals, for selectively resetting said count to a predetermined value.

17. The system of claim 7, wherein a second of said plurality of translator means comprises:
counter means, responsive to signals indicative of a predetermined first particular supervisory signal, for generating a count indicative of the number of sequential occurrences of said first particular supervisory signal in said signal from said telephone set, said count being applied to said memory means as said second code word;
and
means, responsive to signals indicative of a predetermined set of particular supervisory signals not including said predetermined first particular supervisory signal, for generating said strobe control signal to said means for selectively transmitting in accordance with the occurrence of any of said set of supervisory signals in the signal from said telephone set, to effect transmission of the symbol code indicia from the instantaneously addressed location in said memory means.

18. The system of claim 17 wherein said counter means includes means responsive to signals indicative of a predetermined second particular supervisory signal not in said set of supervisory signals, for selectively resetting said count to a predetermined value.

19. The system of claim 10, wherein a second of said plurality of translator means comprises:
counter means, responsive to signals indicative of a predetermined first particular supervisory signal, for generating a count indicative of the number of sequential occurrences of said first particular supervisory signal in said signal from said telephone set, said count being applied to said memory means as said second code word;
and
means, responsive to signals indicative of a predetermined set of particular supervisory signals not including said first predetermined particular supervisory signal for generating said strobe control signal to said means for selectively transmitting in accordance with the occurrence of any of said set of supervisory signals in the signal from said telephone set, to effect transmission of the instantaneously addressed location in said memory means.

20. The system of claim 19 wherein said counter means includes means responsive to signals indicative of a predetermined second particular supervisory signal not in said set of supervisory signals, for selectively resetting said count to a predetermind value.

21. The system of claim 13, wherein a third of said plurality of translator means comprises:
counter means, responsive to signals indicative of a predetermined first particular supervisory signal, for generating a count indicative of the number of sequential occurrences of said first particular supervisory signal in said signal from said telephone set, said count being applied to said memory means as said second code word;
and
means, responsive to signals indicative of a predetermined set of particular supervisory signals not including said first predetermined particular supervisory signal, for generating said strobe control signal to said means for selectively transmitting in accordance with the occurrence of any of said set of supervisory signals in the signal from said telephone set, to effect transmission of the symbol code indicia from the instantaneously addressed location in said memory means.

22. The system of claim 21 wherein said counter means includes means responsive to signals indicative of a predetermined second particular supervisory signal not in said set of supervisory signals, for selectively resetting said count to a predetermined value.

23. The system of claim 1 wherein one of said translator means comprises:
counter means, responsive to signals indicative of the occurrence of supervisory signals in said signal from said telephone set, for selectively generating a count indicative of the number of sequential occurrences of supervisory signals in said signal from said telephone set, said count being selectively applied as said second code word to said memory means; and
means, responsive to supervisory signals having durations greater than a predetermined value, for selectively generating said strobe control signal to said means for selectively transmitting to effect transmission of the symbol code from the instantaneously addressed location in said memory means.

24. The system of claim 23 wherein said counter means includes means, responsive to said strobe control signal, for resetting said count to a predetermined value.

25. The system of claim 23 wherein said counter means includes means responsive to a predetermined first particular supervisory signal for selectively enabling said counter means and means, responsive to a predetermined second particular supervisory signal for inhibiting said counter means and maintaining said count at a predetermined value.

26. The system of claim 24 wherein said counter means includes means responsive to a predetermined first particular supervisory signal for selectively enabling said counter means and means, responsive to a predetermined second particular supervisory signal for inhibiting said counter means and maintaining said count at said predetermined value.

27. The system of claim 7 wherein a second of said translator means comprises:
counter means, responsive to signals indicative of the occurrence of supervisory signals in said signal from said telephone set, for selectively generating a count indicative of the number of sequential occurrences of supervisory signals in said signal from said telephone set, said count being selectively applied as said second code word to said memory means; and
means responsive to supervisory signals having durations greater than a predetermined value, for selectively generating said strobe control signal to said means for selectively transmitting to effect transmission of the symbol code indicia from the instantaneously addressed location in said memory means.

28. The system of claim 27 wherein said counter means includes means, responsive to said strobe signal, for resetting said count to a predetermined value.

29. The system of claim 27 wherein said counter means includes means responsive to a predetermined first particular supervisory signal for selectively enabling said counter means and means, responsive to a predetermined second particular supervisory signal for inhibiting said counter means and maintaining said count at a predetermined value.

30. The system of claim 28 wherein said counter means includes means responsive to a predetermined first particular supervisory signal for selectively enabling said counter means; and means, responsive to a predetermined second particular supervisory signal for inhibiting said counter means and maintaining said count at said predetermined value.

31. The system of claim 10 wherein a second of said translator means comprises:
counter means, responsive to signals indicative of the occurrence of supervisory signals in said signal from said telephone set, for selectively generating a count indicative of the number of sequential occurrences of supervisory signals in said signal from said telephone set, said count being selectively applied as said second code word to said memory means; and means, responsive to supervisory signals having durations greater than a predetermined value, for selectively generating said strobe control signal to said means for selectively transmitting to effect transmission of the symbol code indicia from the instantaneously addressed location in said memory means.

32. The system of claim 13 wherein a third of said translator means comprises:

counter means, responsive to signals indicative of the occurrence of supervisory signals in said signal from said telephone set, for selectively generating a count indicative of the number of sequential occurrences of supervisory signals in said signal from said telephone set, said count being selectively applied as said second code word to said memory means; and means, responsive to supervisory signals having durations greater than a predetermined value, for selectively generating said strobe control signal to said means for selectively transmitting to effect transmission of the symbol code indicia from the instantaneously addressed location in said memory means.

33. The system of claim 15 wherein a second of said translator means comprises:

second counter means, responsive to signals indicative of the occurrence of supervisory signals in said signal from said telephone set, for selectively generating a second count indicative of the number of sequential occurrences of supervisory signals in said signal from said telephone set for selective application as said second code word to said memory means; and means, responsive to supervisory signals having durations greater than a predetermined value, for selectively generating said strobe control signal to said means for selectively transmitting to effect transmission of the symbol code indicia from the instantaneously addressed location in said memory means.

34. The system of claim 19 wherein a third of said translator means comprises:

second counter means, responsive to signals indicative of the occurrence of supervisory signals in said signal from said telephone set, for selectively generating a second count indicative of the number of sequential occurrences of supervisory signals in said signal from said telephone set for selective application as said second code word to said memory means; and means, responsive to supervisory signals having durations greater than a predetermined value, for selectively generating said strobe control signal to said means for selectively transmitting to effect transmission of the symbol code indicia from the instantaneously addressed location in said memory means.

35. The system of claim 21 wherein a fourth of said translator means comprises:

second counter means, responsive to signals indicative of the occurrence of supervisory signals in said signal from said telephone set, for selectively generating a second count indicative of the number of sequential occurrences of supervisory signals in said signal from said telephone set, for selective application as said second code word to said memory means; and means, responsive to supervisory signals having durations greater than a predetermined value, for selectively generating said strobe control signal to said means for selectively transmitting to effect transmission of the symbol code indicia from the instantaneously addressed location in said memory means.

36. A system for converting supervisory signals from a telephone set into a computer compatible code, comprising:

memory means, responsive to address signals applied thereto, and including at least one individually addressable location corresponding to each symbol in said computer compatible code and containing indicia of the corresponding code symbol, for generating an output signal indicative of the contents of an addressed location therein in accordance with said address signals;

means, responsive to said memory means output signals and strobe signals applied thereto, for selectively transmitting indicia of said symbol code to said computer;

decoder means, responsive to said supervisory signals, for generating a first code word indicative of the identity of particular supervisory signals from said telephone set;

means for applying said first code word to said memory means as a portion of said address signal;

first detector means, for generating latch command signals indicative of the occurrence of relatively long duration supervisory signals which have durations longer than a predetermined period;

latch means, responsive to said latch command signals, for responsively storing indicia of at least a portion of said first code word corresponding to said long duration supervisory signals, for application to said memory means as a portion of said address signal; and strobe means, responsive to relatively short duration supervisory signals, for responsively generating a strobe control signal to said means for selectively transmitting, to effect transmission of the symbol code indicia from the instantaneously addressed location in said memory means.

37. The system of claim 36, wherein said latch means includes means responsive to a predetermined particular supervisory signal, for selectively resetting said latch means stored indicia to a predetermined count.

38. A system for converting supervisory signals from a telephone set into a computer compatible code, comprising:

memory means, responsive to address signals applied thereto, and including at least one individual addressable location corresponding to each symbol in said computer compatible code and containing indicia of the corresponding code symbol, for generating an output signal indicative of the contents of an addressed location therein in accordance with said address signals;

means, responsive to said memory means output signals and strobe signals applied thereto, for selectively transmitting indicia of said symbol code to said computer;

decoder means, responsive to said supervisory signals, for generating a first code word indicative of the identity of particular supervisory signals from said telephone set;

means for applying said first code word to said memory means as a portion of said address signal;

counter means, responsive to signals indicative of a predetermined first particular supervisory signal, for generating a count indicative of the number of sequential occurrences of said first particular supervisory signal in said signal from said telephone set, said count being applied to said memory means as a portion of said address signal; and means, responsive to signals indicative of a predetermined set of particular supervisory signals not including said predetermined first particular supervisory signal, for generating said strobe control signal to said means for selectively transmitting in accordance with the occurrence of any of said set of supervisory signals in the signal from said telephone set, to effect transmission of the instantaneously addressed location in said storage means.

39. The system of claim 38 wherein said counter means includes means, responsive to signals indicative of a predetermined second particular supervisory signal not in said set of supervisory signals, for selectively resetting said count to a predetermined value.

40. A system for converting supervisory signals from a telephone set into a computer compatible code, comprising:

memory means, responsive to address signals applied thereto, and including at least one individual addressable location corresponding to each symbol in said computer compatible code and containing indicia of the corresponding code symbol, for generating an output signal indicative of the contents of an addressed location therein in accordance with said address signals;

means, responsive to said memory means output signals and strobe signals applied thereto, for selectively transmitting indicia of said symbol code to said computer;

decoder means, responsive to said supervisory signals, for generating a first code word indicative of the identity of particular supervisory signals from said telephone set;

means for applying said first code word to said memory means as a portion of said address signal, said count being selectively applied as said second code word to said memory means;

counter means, responsive to signals indicative of the occurrence of supervisory signals in said signal from said telephone set, for selectively generating a count indicative of the number of sequential occurrences of supervisory signals in said signal from said telephone set for application to said memory means as a portion of said address signal; and means, responsive to supervisory signals having durations greater than a predetermined value, for selectively generating said strobe signal to said means for selectively transmitting to effect transmission of the code symbol indicia from the instantaneously addressed location in said memory means.

41. The system of claim 40 wherein said counter means includes means, responsive to said strobe signal, for resetting said count to a predetermined value.

42. The system of claim 40 wherein said counter means includes means responsive to a predetermined first particular supervisory signal for selectively enabling said counter means and means, responsive to a predetermined second particular supervisory signal for inhibiting said counter means and maintaining said count at a predetermined value.

43. The system of claim 41 wherein said counter means includes means responsive to a predetermined first particular supervisory signal for selectively enabling said counter means; and means, responsive to a predetermined second particular supervisory signal for inhibiting said counter means and maintaining said count at said predetermined value.

44. A method of communicating a character to a remote site utilizing a telphone set, incuding a plurality of keys, the depression of which effects generation of a respective corresponding DTMF signal, said character being chosen from a set of characters portrayed on said keys in predetermined ordered groups, each ordered group of characters being associated with a respective associated key, said set of characters being nominally divided into a plurality of placement divisions in accordance with the relative placement of the individual characters in the ordered groups on said keys, the method comprising:

depressing a first designated key, not associated with any of said characters, a predetermined number of times indicative of the placement division of said character, to thereby generate a corresponding number of DTMF signals indicative of said designated key to said remote site;

developing at said remote site, responsive to said DTMF signals corresponding to said depressing of said first designated key, a placement division count indicative of the placement division of said character;

subsequently depressing the key associated with said character, to thereby generate a corresponding DTMF signal to said remote site indicative of said associated key;

developing at said remote site, responsive to said associated key corresponding DTMF signal, indicia of said associated key; and developing at said remote site, responsive to said placement division count and said indicia of said associated key, indicia of said character.

45. The method of claim 44, further including:

the step of selectively depressing a second designated one of said keys not associated with any of said characters to thereby generate a corresponding DTMF signal to said remote site; and detecting, at said remote site, said DTMF signal corresponding to said second designated key, and responsively setting said placement division count to a predetermined value.

46. A method of communicating a character to a remote site, utilizing a telephone set of the type including respective keys, the depression of which effects generation of a respective corresponding DTMF signal, said character being chosen from a set of characters nominally divided into a plurality of placement divisions, each of said set of characters being associated with a respective associated key, only one character from any given placement division being associated with any given key, the method comprising the steps of:

first depressing said key associated with said character a number of times indicative of the placement division of said character less one, each said first depressing being of a relatively short duration, to generate thereby to said remote site a corresponding number of short duration corresponding DTMF signals;

subsequently depressing said key associated with said character, for a relatively long duration to generate a long duration corresponding DTMF signal;

detecting, at said remote site, said short duration and long duration corresponding DTMF signals, and developing therefrom a placement division count indicative of the placement division of said character to be communicated;

detecting at said remote site said long duration corresponding DTMF signal; and developing, responsive to said placement division count and said long duration corresponding DTMF signal, indicia of said character.

47. The system of claim 36, wherein said system further includes means, responsive to said memory means output signals, for generating audible feedback signals to said telephone set, indicative of said symbol code transmitted to said computer.

48. The system of claim 47 wherein said audible feedback signals constitute a synthesized speech signal corresponding to said symbol.

49. The system of claim 38, wherein said system further includes means, responsive to said memory means output signals, for generating audible feedback signals to said telephone set, indicative of said symbol code transmitted to said computer.

50. The system of claim 49 wherein said audible feedback signals constitute a synthesized speech signal corresponding to said symbol.

51. The system of claim 40, wherein said system further includes means, responsive to said memory means output signals, for generating audible feedback signals to said telephone set, indicative of said symbol code transmitted to said computer.

52. The system of claim 51 wherein said audible feedback signals constitute a synthesized speech signal corresponding to said symbol.

* * * * *

REEXAMINATION CERTIFICATE (2347th)
United States Patent [19]
Tsakanikas

[11] B1 4,427,848
[45] Certificate Issued   Aug. 2, 1994

[54] TELEPHONIC ALPHANUMERIC DATA TRANSMISSION SYSTEM

[75] Inventor: Peter J. Tsakanikas, Arlington, Va.

[73] Assignee: Telephone Lottery Company, Inc., Johnstown, Pa.

Reexamination Request:
No. 90/003,189, Sep. 7, 1993

Reexamination Certificate for:
Patent No.: 4,427,848
Issued: Jan. 29, 1984
Appl. No.: 335,516
Filed: Dec. 29, 1981

[51] Int. Cl.[5] .................. H04M 11/06; H04M 11/08
[52] U.S. Cl. ........................................ 379/88; 379/97
[58] Field of Search ....................... 379/97, 52, 88, 89, 379/93, 386, 283

[56] References Cited

U.S. PATENT DOCUMENTS

3,870,821  3/1975  Steury ..................................... 379/96
4,304,968  12/1981  Klausner et al. ...................... 379/69

OTHER PUBLICATIONS

Broomfield, et al., "Making a Data Terminal out of the Touch-Tone Telephone," *Electronics* 124–29 (Jul. 1980).

Haag, "Two-D Code: A Character Set Code Convention for a 'Touchtone' Telephone Keyboard," *NCC '78 Personal Computing Digest* 319 (1978).

*Primary Examiner*—Thomas W. Brown

[57] ABSTRACT

A system for translating interconnection supervisory signals, such as Touch Tone signals or dial pulses, from a remote telephone set into alphanumeric data. The system is capable of utilizing any one of a plurality of translation schemes, chosen by the user at the telephone set. Synthesized speech feedback is provided to the user after entry of each character. A number of new translation techniques are also disclosed.

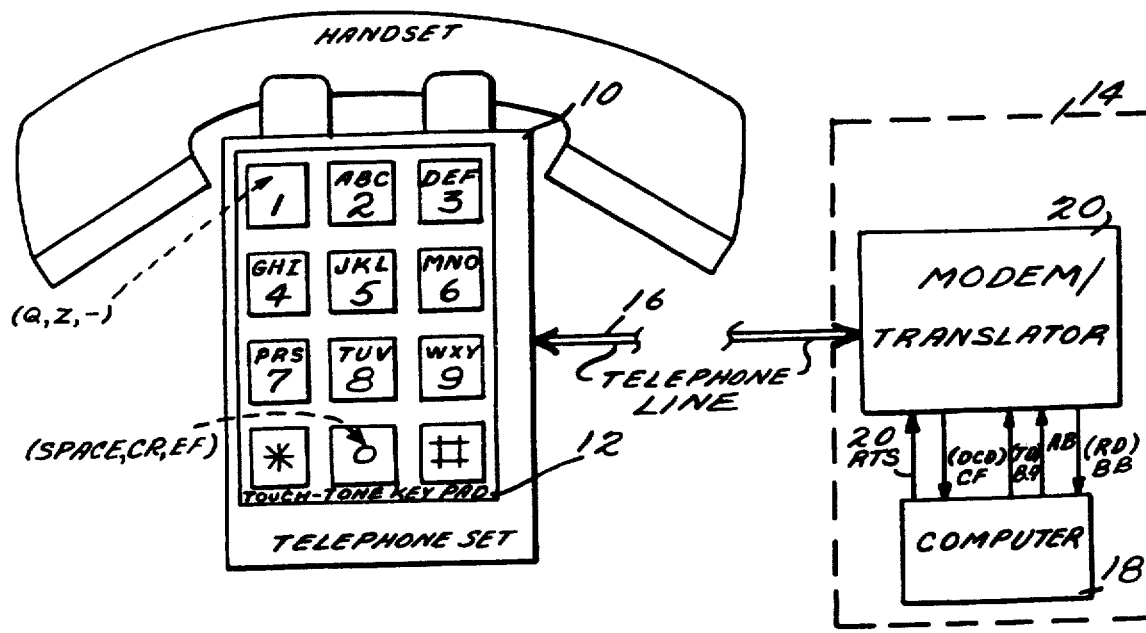

REEXAMINATION CERTIFICATE ISSUED UNDER 35 U.S.C. 307

NO AMENDEMENTS HAVE BEEN MADE TO THE PATENT

AS A RESULT OF REEXAMINATION, IT HAS BEEN DETERMINED THAT:

The patentability of claims 1–52 is confirmed.

* * * * *